United States Patent [19]

Dürr et al.

[11] 4,424,474
[45] Jan. 3, 1984

[54] METHOD AND CIRCUIT ARRANGEMENT FOR CONTROLLING THE R.P.M. OF A THREE-PHASE MOTOR

[75] Inventors: Walter Dürr, Offenbach; Dietrich Weisse, Waibstadt; Ulrich Simon, Dreieich; Friedwalt von Neufville-Schoepflin, Kelkheim, all of Fed. Rep. of Germany

[73] Assignee: Firma IWE Ingenieurgellschaft fuer wirtschaftliche Energienutzung mit beschraenkter Haftung, Neu-Isenburg, Fed. Rep. of Germany

[21] Appl. No.: 326,907

[22] Filed: Dec. 2, 1981

[30] Foreign Application Priority Data

Dec. 10, 1980 [DE] Fed. Rep. of Germany ....... 3046406

[51] Int. Cl.³ .............................................. H02P 5/40
[52] U.S. Cl. ..................................... 318/798; 318/799
[58] Field of Search ............... 318/799, 798, 751, 752, 318/762

[56] References Cited

U.S. PATENT DOCUMENTS

| | | | |
|---|---|---|---|
| 3,309,593 | 3/1967 | Egglestone et al. | 318/756 |
| 3,345,549 | 10/1967 | Hauser et al. | 718/799 |
| 3,376,485 | 4/1968 | Shibata et al. | 318/799 |
| 3,387,196 | 6/1968 | Graham et al. | 318/799 |
| 3,437,911 | 4/1969 | Gutzwiller | 318/806 |
| 3,487,345 | 12/1969 | Watrous et al. | 307/252 B |

Primary Examiner—David Smith, Jr.
Attorney, Agent, or Firm—W. G. Fasse; D. H. Kane, Jr.

[57] ABSTRACT

The present method and circuit arrangement control the r.p.m. of a three-phase motor connected in a star or Y-circuit by sensing current variations in the star point of the motor windings. These current variations are converted into voltage variations which represent the current input of the motor windings. These voltage variations are used to control the duration of the application of the operating voltage to the motor windings for varying the motor r.p.m. The circuit for this purpose includes a controlled diode circuit arrangement connecting the motor windings to the star point and a control or drive circuit for controlling the diode circuit arrangement. The drive circuit makes the diode circuit arrangement conductive for predetermined time durations which depend on the voltage variations. These time durations are also manually adjustable in an open loop control, whereby a closed loop control is provided in combination with an open loop control.

15 Claims, 7 Drawing Figures

METHOD AND CIRCUIT ARRANGEMENT FOR CONTROLLING THE R.P.M. OF A THREE-PHASE MOTOR

CROSS-REFERENCE TO RELATED APPLICATION

The present application is based on the corresponding German Patent Application No. P 30 46 406.3, filed on Dec. 10, 1980 in the Federal Republic of Germany. The priority of the German filing date is claimed for the present application.

BACKGROUND OF THE INVENTION

The invention relates to a method and circuit arrangement for controlling the r.p.m of a three-phase motor, the windings of which are connected in a Y-circuit or in a star circuit configuration.

Heretofore it has been customary to control the r.p.m. of three- or poly-phase motors by a direct control of the motor current. Directly influencing the motor current has been rather involved and expensive because large components are necessary which in turn require a substantial space for their accommodation.

OBJECTS OF THE INVENTION

In view of the foregoing it is the aim of the invention to achieve the following objects singly or in combination:

to provide a method and circuit arrangement for controlling or regulating the r.p.m. of a three-phase or of a multi-phase electric motor which achieves the control more efficiently and at a lesser expense than was possible heretofore;

to control the r.p.m. of a three-phase or multi-phase electric motor in several stages or ranges;

to make the control range for the r.p.m. adjustable, for example, by adjusting a resistor in a controlling circuit;

to provide an r.p.m. control circuit for a three-phase or multi-phase motor which is especially suitable for regulating and/or controlling pump motors especially in heating systems; and to provide an r.p.m. circuit arrangement for a three-phase or multi-phase electric motor which circuit may be implemented by low voltage circuit elements so as not to require, for example, power thyristors.

SUMMARY OF THE INVENTION

The method according to the invention teaches converting the current variations occurring in the star point of the motor windings into voltage variations as a function of the current input of the motor windings. These voltage variations are used to determine the operation of a controlling circuit which reduces the r.p.m. of the motor in response to a reduced input current by supplying the operating voltages to the respective windings only for a pre-adjustable time duration.

The circuit arrangement according to the invention comprises a controlled diode system which connects the motor windings to the star point. The star point is connected to one terminal of a power source, such as a d.c. power source, and the controllable diode system or diode circuit is connected through a controlling circuit arrangement to the other terminal of the d.c. power source for controlling the time duration during which the three-phase power supply is connected to the motor windings by rendering said diode circuit conductive during said time duration and non-conductive during intermediate time intervals between said time durations.

Each diode system or circuit may comprise triac means. However, the invention is not limited to using triac circuit components because according to another embodiment each diode circuit arrangement may comprise a bridge circuit rectifier, for example, a full wave rectifier and each motor winding is connected through a branch of the bridge rectifier circuit to the star point of the motor operating circuit arrangement. Simultaneously, each motor winding is connected through a branch of the bridge rectifier circuit and through a thyristor to the star point of the motor driving circuit arrangement.

A separate diode circuit system may be provided for each stage of a plurality of r.p.m. stages or ranges, if it is desired to operate the motor in a plurality of r.p.m. control ranges.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
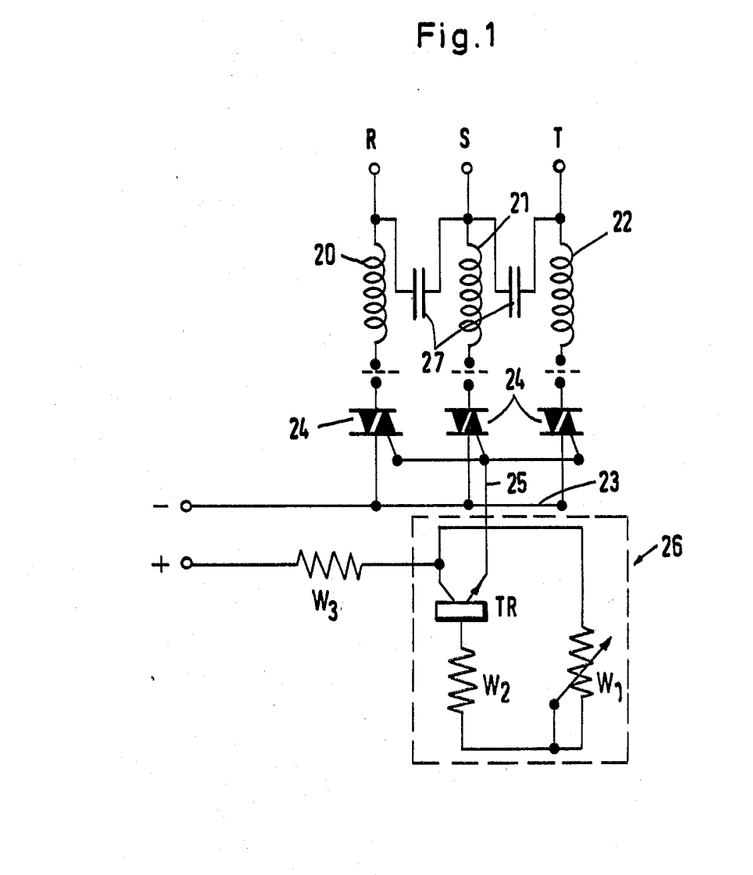
FIG. 1 is a first simple embodiment of the invention employing triac circuit elements as the controlled circuit components.

The example embodiment of FIG. 1 comprises a motor with the motor windings 20, 21 and 22. The motor windings of the three-phase motor are connected to a three-phase power supply symbolically represented by the terminal, R, S, and T. Capacitors 27 are connected between the input ends of the windings 20 and 21 as well as 21 and 22 respectively. The output ends of the motor windings 20, 21, 22 are connected through controllable circuit means to the star point 23 of the motor drive circuit. The controllable circuit means comprise three triacs 24 the control terminal of which is connected to a control conductor 25 leading to a controlling circuit 26. A circuit interrupter, for example a fuse, is conventionally interposed between each motor winding and the respective triac.

The control conductor 25, which is connected in common to all control terminals of the triacs 24, is also connected to the emitter terminal of a transistor TR in the controlling circuit 26. The transistor TR operates substantially as a switch. The collector electrode of the transistor TR is connected through a limiting resistor W3 to one terminal of an auxiliary power source such as a d.c. power source. The other terminal of the d.c. power source is connected to the star point 23 of the motor drive circuit. The controlling circuit 26 further comprises a base resistor W2 and an adjustable resistor W1 connected between the collector terminal and the resistor W2. By adjusting the resistor W1 it is possible to adjust the base voltage of the transistor TR whereby the time duration during which the triacs 24 are conducting, may be manually adjusted for an open loop control.

In the shown example of FIG. 1 the star point 23 is connected to the negative terminal of the d.c. power source while the collector of the controlling transistor switch TR is connected through the limiting resistor W3 to the positive terminal of the d.c. power source. The capacitors 27, mentioned above, form with the windings 20, 21 and 22 resonance circuits for suppressing parasitic voltages in the form of harmonic waves.

Figure 2:
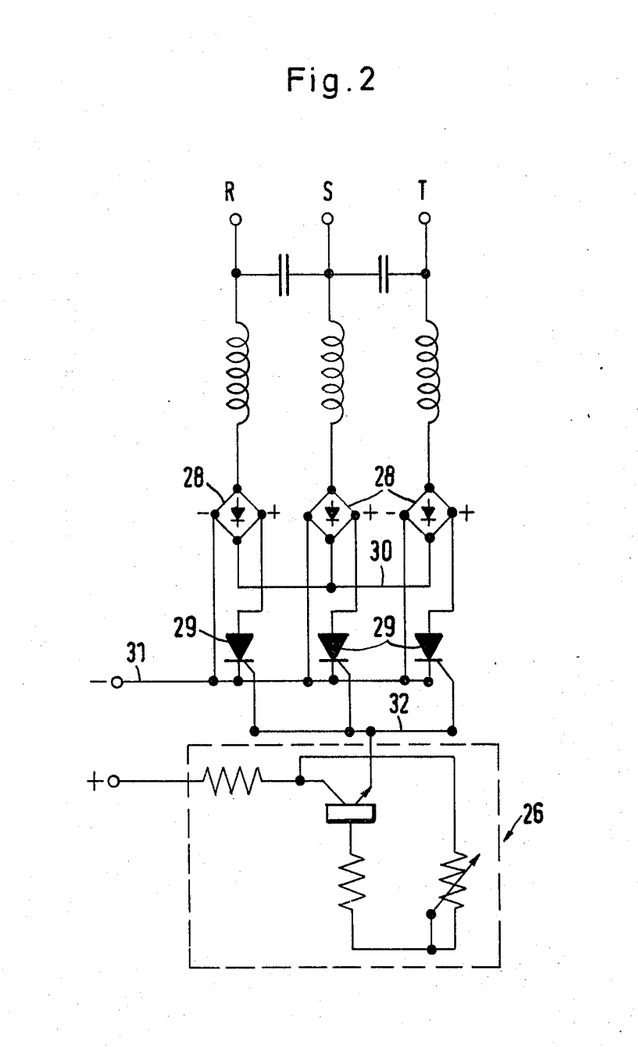
FIG. 2 is a second simple embodiment of the invention in which the controlled circuit components are full wave bridge rectifiers and diodes.

The circuit arrangement of FIG. 2 is basically of the same structure as that of FIG. 1. Instead of the triacs 24 the FIG. 2 embodiment comprises a full wave rectifier 28 operatively connected to its respective motor winding and to the star point 31 as well as to controllable diodes 29. More specifically, the motor windings are connected to one a.c. terminal of the respective full wave rectifier while the other a.c. terminal of each rectifier 28 is short circuited by a conductor 30. The negative d.c. terminal of each rectifier bridge circuit 28 is connected directly to the negative terminal of a d.c. power source connected to the star point 31. The positive terminals of the bridge rectifier circuits 28 are connected through respective controllable diodes, such as silicone controlled rectifier diodes, to a controlling conductor 32. The controlling conductor 32 is connected to the control transistor in the controlling circuit arrangement 26 corresponding to that described with reference to FIG. 1. Reverse blocking thyristors are suitable for embodying the controlled diodes 29. The cathode control terminal is connected to the control conductor 32.

Figure 3:
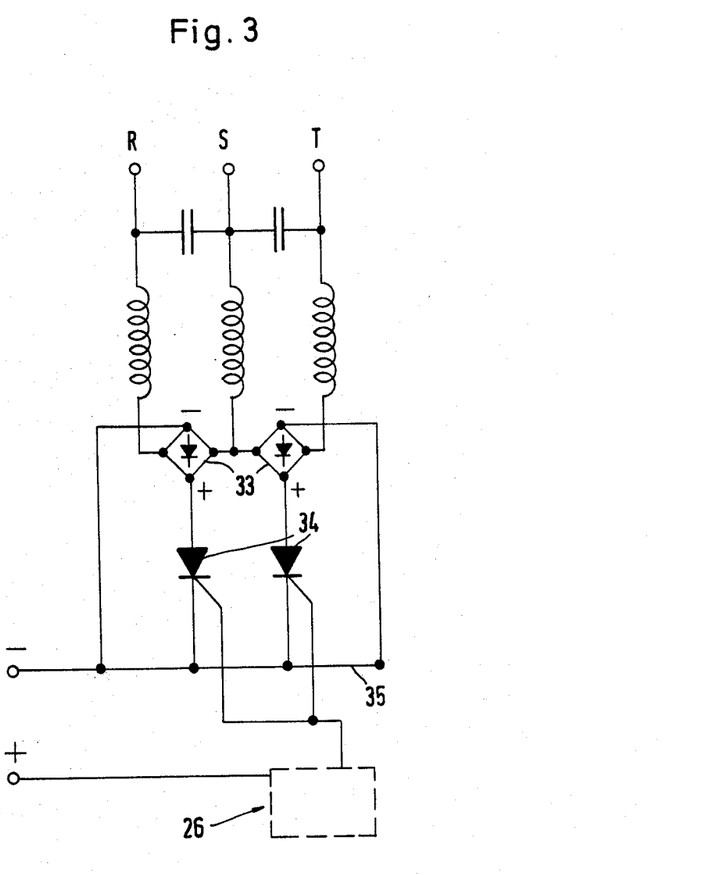
FIG. 3 is a circuit arrangement similar to that of FIG. 2, however, employing only two bridge rectifier circuits and two controlled diodes for the three-phase motor windings.

The circuit arrangement of FIG. 3 illustrates basically an embodiment quite similar to that of FIG. 2. However, in FIG. 3 only two full wave rectifiers 33 are connected to the motor windings as shown. The controlled diodes 34 are also connected to the star point 35 leading to the negative terminal of a d.c. power source. The cathode control terminal of each controlled diode 34 is connected in common to the controlling circuit 26. As shown in FIG. 2 the a.c. terminals of the full wave bridge rectifiers 33 are connected between two adjacent motor windings. The controlling circuit 26 is the same as in FIGS. 1 and 2 and is connected to the positive terminal of the d.c. power source as shown in FIG. 1.

In operation the above described arrangements according to FIGS. 1, 2 and 3 control the r.p.m. of the three-phase motor automatically. The sum of the individual phase currents flows through the star points 23 in FIG. 1 or 31 in FIG. 2 or 35 in FIG. 3. The controlled diode circuit arrangement in each embodiment converts any occurring variations of the current flowing through the star point into respective voltage variations in response to the current input to the windings 20, 21, and 22. The controlling circuit 26, which is based manually by the operator to a predetermined r.p.m. by the adjustment of the resistor W1, maintains the r.p.m by periodically switching the diode circuit arrangements into the conducting state for periodically applying the three-phase power source to energize the motor windings. Once the resistor W1 is adjusted to a predetermined r.p.m., the system will maintain that r.p.m. However, the r.p.m. may be changed by adjusting the resistor W1.

The advantages of the described circuit arrangements are seen in that it is not necessary to switch long transmission lines. Therefore, it is possible to use relatively small circuit components which are correspondingly less expensive and additionally do not pose any substantial problems with regard to the cooling of these small circuit components. Thus, it is a further advantage that the closed loop and/or open loop control circuits or controlling circuits may be relatively compact.

It is especially advantageous to use circuit arrangements according to the invention for the open loop and/or closed loop control of pump motors particularly in heating systems. In connection with closed loop heating control systems including external temperature sensors and room thermostats, the lead temperature of the exterior or room temperature is respectively adapted. Each radiator is also equipped with a thermostatic valve whereby an additional individual temperature control is possible for each room.

For this purpose it is necessary to switch the respective pump automatically in three r.p.m. stages when the lead temperature is changed. Additionally it is necessary to provide for an r.p.m. change in the third stage or range in response to the opening or closing of the thermostatic valves at the individual radiators.

Figure 4:
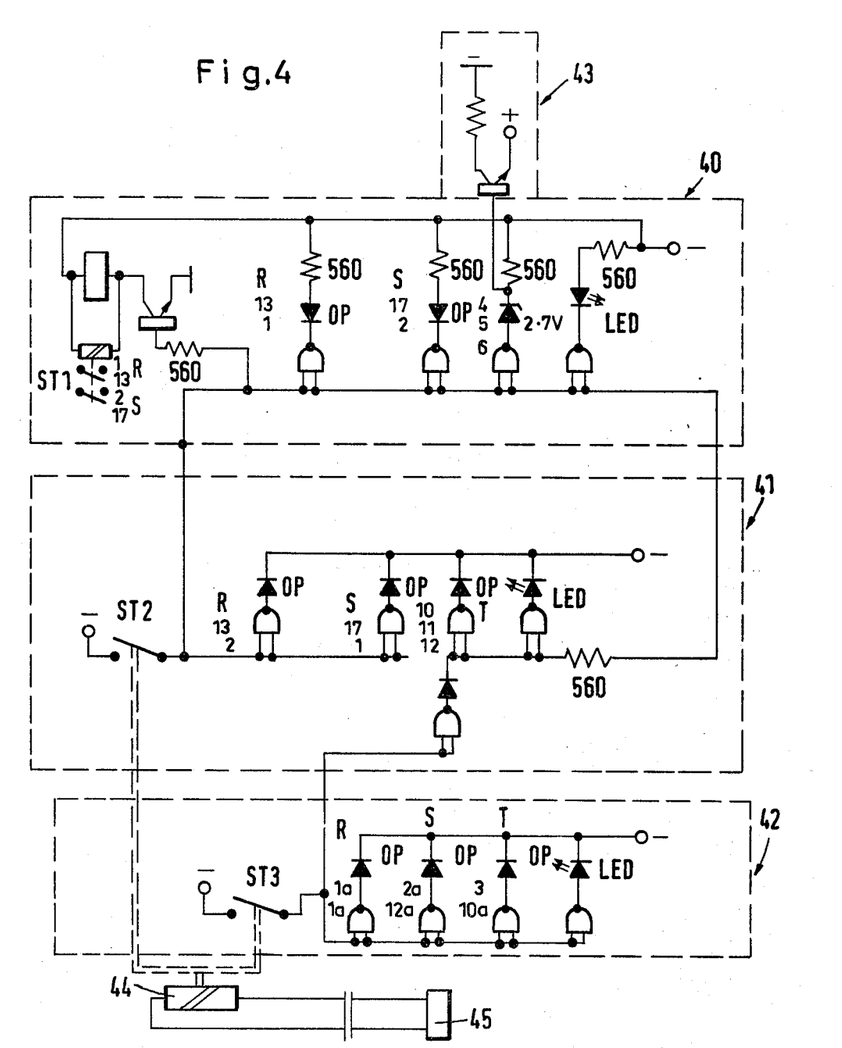
FIG. 4 illustrates three stages of a controlling circuit arrangement by means of which the r.p.m. of a three-phase motor may be controlled in three r.p.m. stages or ranges.
Figure 5A:
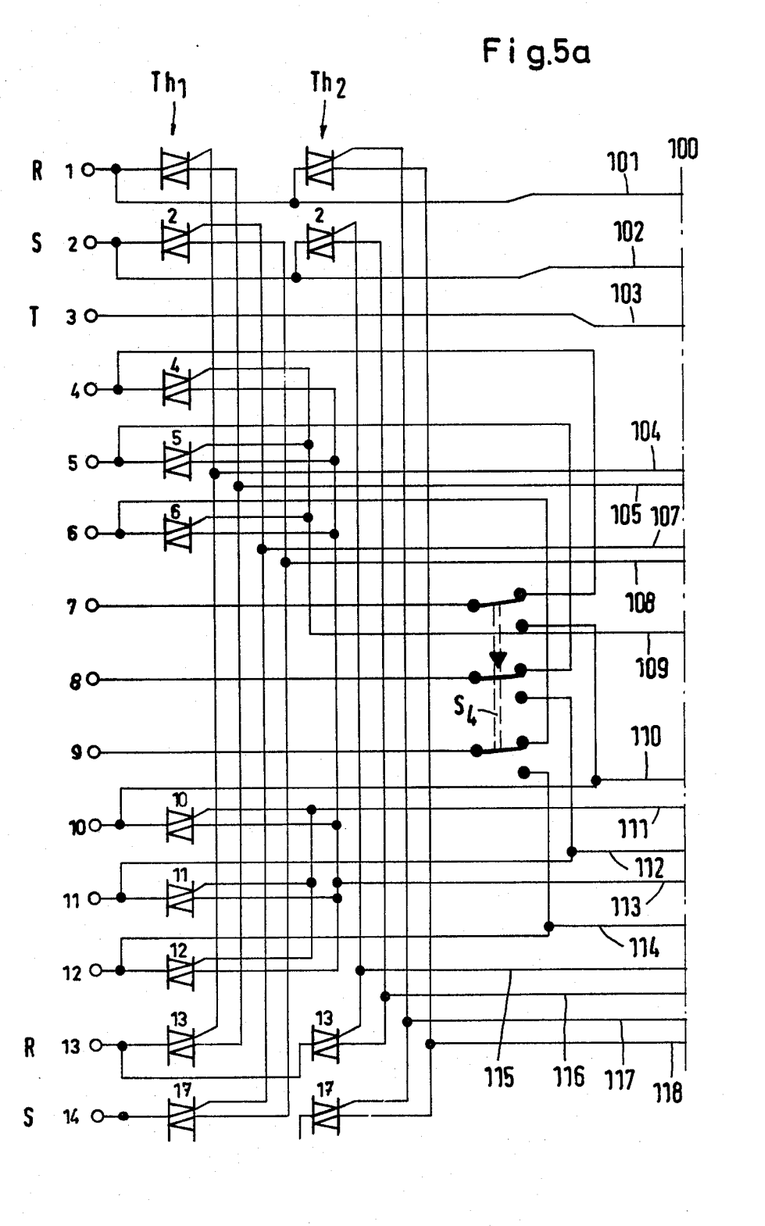
FIGS. 5a and 5b illustrate controlled or controllable circuits with triacs arranged for cooperation with the controlling circuit arrangement according to FIG. 4, whereby however, the controlled circuits are arranged for a motor having divided motor windings.

FIGS. 4 and 5a as well as 5b show a practical embodiment of a circuit arrangement according to the invention in which the motor of a heating pump comprises a total of six windings. The windings connected to the three phase power supply lines R and S may be connected or switched in a crossover relationship. Thus, it is necessary to provide fourteen terminals between the controlling circuit arrangement and the windings. The simple controlling circuit arrangement 26 of the FIGS. 1, 2 and 3 is then replaced by the controlling circuit arrangement shown in FIG. 4. The circuit arrangement of FIG. 4 is simultaneously used for controlling in a closed and/or open loop fashion the pump r.p.m. in three different stages. The first pump r.p.m. is controlled by the circuit arrangement unit 40. The second stage is controlled by the unit 41 and the third stage is controlled by the unit 42. The input circuit connected to the d.c. power source is shown at 43.

Each unit cooperates with a switch ST1, ST2, and ST3. At least the r.p.m. stage switches ST2 and ST3 are operated by a relay 44 which is controlled by a thermostatic sensor 45.

Each of the circuit arrangement units 40, 41 and 42 comprises an optical coupling device for each phase R, S and T of the three-phase system and a control light emitting diode LED. Each optical coupling device in FIG. 4 is designated by two or three numbers which correspond to the above mentioned winding terminals 1 to 14 also shown in FIG. 5a.

Figure 5B:
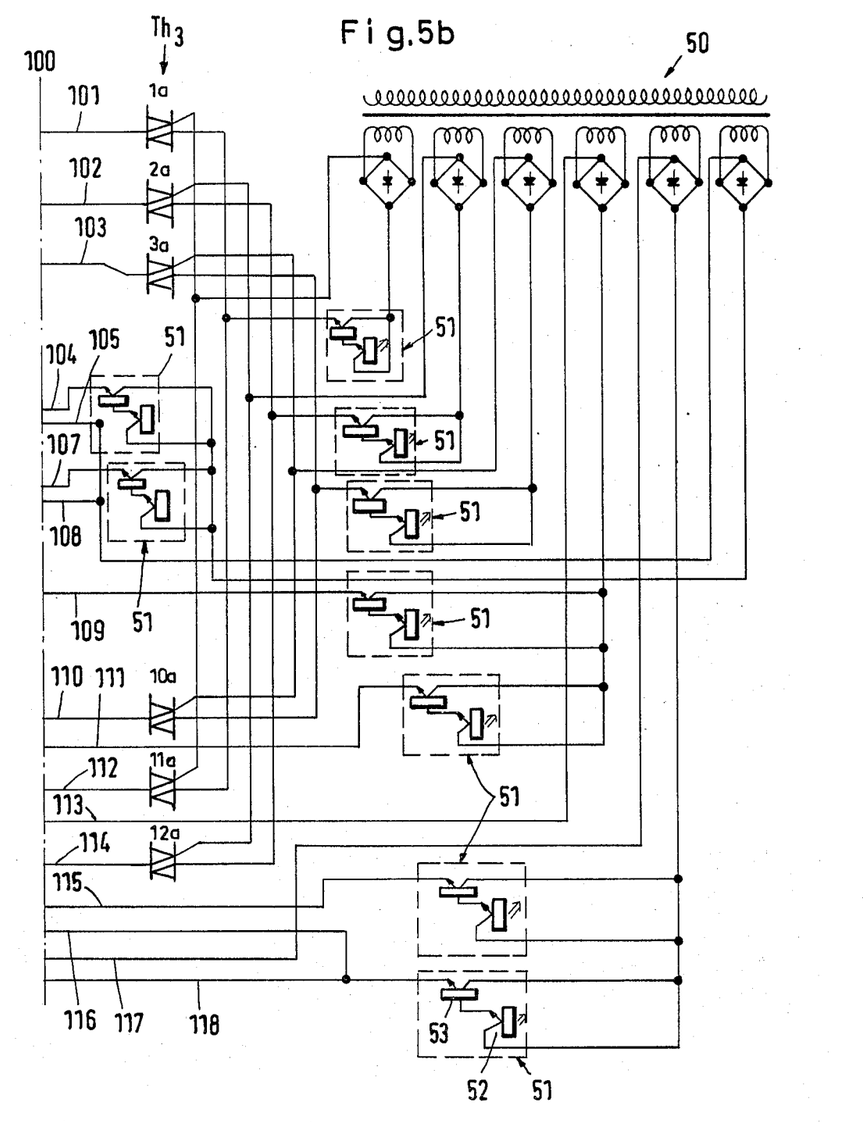

The optical coupling devices galvanically separate the controlling circuit shown in FIG. 4 from the controlled circuit arrangements which are connected to the actual motor windings or winding portions as shown in FIGS. 5a and 5b. FIG. 5a is connected to FIG. 5b along the line 100, whereby the conductors or terminals 101 to 118 of FIG. 5a correspond to the terminals or conductors 101 to 118 of FIG. 5b.

The d.c. power supply is provided by a rectifying unit 50 shown in FIG. 5b.

The optical coupling devices OP of FIG. 4 form a component of circuit arrangements 51 shown in FIG. 5b. All the circuit arrangements 51 are identical to each other. Each circuit arrangement 51 comprises a phototransistor 52 which is light responsive and a switching transistor 53, as shown at the bottom of FIG. 5b.

The circuit arrangements 51 are connected through their respective switching transistors 53 to thyristor circuits Th1, Th2 and Th3 for driving or controlling the energization of the motor windings 1 to 14. Each thyristor in the thyristor groups Th1, Th2 and Th3 is provided with a number corresponding to the number of the winding terminal to which the respective thyristor is connected. The switch S4 is used for connecting those motor windings in a crossover configuration which, as mentioned above, are adapted for such crossover connection for the purpose of starting the three-phase motor.

The example embodiment shown in FIGS. 4 and 5 shows that the method according to the invention for controlling in a closed or open loop fashion the r.p.m. of a three-phase operated motor may be performed by a circuit arrangement which is substantially less expensive than comparable prior art circuit arrangements because all the components are merely low voltage components and because power thyristors are not required. Heretofore it was necessary to use such power thyristors because the prior art circuits required the switching of the entire current flowing through a winding by means of a power thyristor. In spite of the plurality of structural circuit components it has been found, that the entire circuit arrangement can be realized at an economical price and in a compact structure.

The galvanic separation between the controlling circuit arrangement and the controlled circuit arrangement by means of optical couplers has the advantage, among others, that the two circuits cannot influence each other in undesirable ways.

Figure 6:
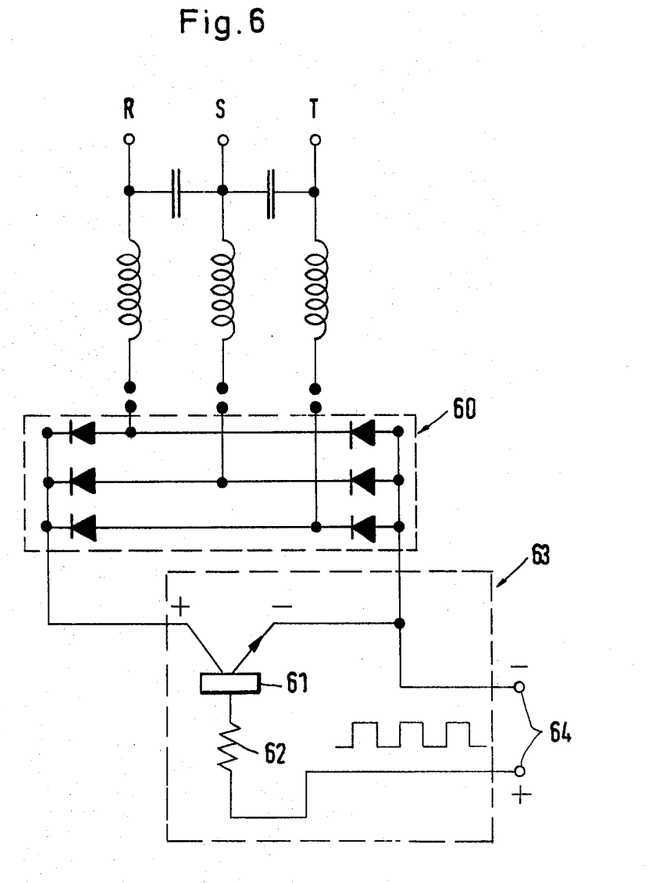
FIG. 6 illustrates a further simple embodiment according to the invention using as the controlled circuit a three-phase rectifier bridge and as the controlling circuit a transistor circuit responding to an impulse waveform at its input terminals.

FIG. 6 shows a further simple embodiment of the invention in a schematic manner. In FIG. 6 the motor windings are connected to respective terminals of a three-phase rectifier bridge circuit 60. At least one switching transistor 61 having a base resistor 62 in a controlling circuit arrangement 63 is connected to the respective terminals of the three-phase bridge rectifier circuit 60. The collector terminal of the switching transistor 61 is connected to the respective positive output terminal of the three-phase rectifier circuit. The emitter terminal of the switching transistor 61 is connected to the negative terminal of the bridge rectifier circuit 60 and to the negative terminal member of the control input 64 of the circuit 63. The base of the switching transistor 61 is connected through the base transistor 62 to the positive terminal member of the control input 64.

In operation the arrangement of FIG. 6 receives at the control input 64 of the controlling circuit 63 a square waveform having a frequency corresponding to the base frequency of the three-phase power supply. The pulse width of the square waveform is variable. If it is desired to keep the frequency of the square waveform constant, it is possible to vary the frequency of the three-phase power supply for the motor windings in order to control the r.p.m. Further, it is possible to provide a combined control which involves varying the frequency of the three-phase power supply as well as the pulse width of the control input square waveform.

Additionally it is possible to connect with the resistor 62 a variable resistor in series as shown in FIG. 1, where the resistor W1 connects the resistor W2 to the collector of the switching transistor. This feature may also be employed in FIG. 6 for varying the switching times of the transistor 61.

The following semi-conductor circuit components have been used in an example embodiment according to the invention.

| 1. | Switching Transistor TR | S | q | 50 | Fe | 45 |
|----|---|---|---|---|---|---|
| 2. | Diode Rectifier | B | y | x | 48 | 600 |
| 3. | Triac 24 | T | i | c | 226 | n |
| 4. | Thyristor 29 | B | S | 7 - | 04 | A |

Although the invention has been described with reference to specific example embodiments, it is to be understood that it is intended to cover all modifications and equivalents within the scope of the appended claims.

What is claimed is:

1. A method for controlling the r.p.m. of a multi-phase electric motor having motor windings connected in a Y-circuit or star circuit including a star point, and operated by a multi-phase power supply source connectable to respective motor windings, comprising the following steps:
   (a) sensing current variations in said star point by a controllable diode circuit means having a single common control input;
   (b) converting said current variations into voltage variations representing the current flow through the motor windings;
   (c) and controlling in an on-off manner with a single controlling circuit connected to said single control input the time durations during which the multi-phase power supply is connected to and disconnected from the motor windings by the conduction and non-conduction of said diode circuit means as a function of said voltage variations whereby the motor r.p.m. is reduced in response to a decreasing current flow through the motor windings.

2. The method of claim 1, further comprising manually preadjusting the range of the controlling of said time durations.

3. The method of claim 1 or 2, further comprising dividing said motor windings into a plurality of winding stages, and automatically adjusting the time durations during which the power supply is individually connected to these winding stages.

4. A circuit arrangement for controlling the r.p.m. of a multi-phase electric motor having motor windings connected in a Y-circuit or in a star circuit including a star point, and operated by a multi-phase power supply source, comprising a plurality of controllable diode circuit means each having its respective control input, said diode circuit means being operatively connected between said motor windings and said star point, a common control terminal operatively connected in common to all control inputs of said diode circuit means, a d.c. power source, means connecting said star point to one terminal of said d.c. power source, and a controlling circuit means operatively connected in common between the other terminal of said d.c. power source and said common control terminal of said diode circuit means for controlling the multi-phase power supply in an on-off manner so that during certain time durations the multi-phase power supply is connected to the motor windings by rendering said diode circuit means conductive during said certain time durations and by rendering said diode circuit means non-conductive during intermediate time intervals between said certain time durations.

5. The circuit arrangement of claim 4, further comprising capacitors operatively connected between said motor windings at the multi-phase power supply source ends thereof for suppressing harmonic parasitic voltages.

6. The circuit arrangement of claim 4 or 5, wherein said controllable diode circuit means comprise a plurality of separate stages for a like plurality of motor winding sections.

7. The circuit arrangement of claim 6, wherein said controlling circuit means comprise a separate controlling circuit for each controllable diode circuit stage.

8. The circuit arrangement of claim 4, further comprising two rectifier circuits connected with their input terminals between two motor winding output terminals, said rectifier circuits having output terminals one of which is directly connected to said star point, said controllable diode circuit means comprising two controllable diodes connecting the other output terminals of said rectifier circuits to said star point, said controlling circuit means being connected to said controllable diodes for controlling said time duration.

9. The circuit arrangement of claim 4, wherein each controllable diode circuit means comprises respective triac means.

10. The circuit arrangement of claim 4, wherein said controllable diode circuit means comprise bridge rectifier means and thyristor means, whereby each motor winding is connected through a branch of the bridge rectifier means to the star point and also through another branch of the bridge rectifier means and one of said thyristor means to said star point.

11. The circuit arrangement of claim 4, further comprising circuit switch means for galvanically separating said controllable diode circuit means from said controlling circuit means.

12. The circuit arrangement of claim 4, wherein said controllable diode circuit means comprise multi-phase bridge circuit rectifier means and wherein said controlling circuit means comprise at least one switching transistor operatively connected to said multi-phase bridge circuit rectifier means.

13. The circuit arrangement of claim 12, wherein said switching transistor is operable by a control voltage having an impulse waveform, such as a square waveform.

14. The circuit arrangement of claim 13, wherein said impulse waveform has an adjustable pulse width.

15. The circuit arrangement of claim 13, wherein said impulse waveform has an adjustable frequency.

* * * * *